(12) United States Patent
Stark et al.

(10) Patent No.: US 10,458,343 B2
(45) Date of Patent: Oct. 29, 2019

(54) EXHAUST GAS FLAP

(71) Applicant: Eberspächer Exhaust Technology GmbH & Co. KG, Neunkirchen (DE)

(72) Inventors: Annika Stark, Wernau (DE); Steffen Schmitt, Ostfildern (DE); Stefanos Varelis, Leinfelden (DE); Bernd Müller, Saarwellingen (DE); Jan Pallmann, Zweibrücken (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 74 days.

(21) Appl. No.: 15/797,397

(22) Filed: Oct. 30, 2017

(65) Prior Publication Data
US 2018/0119621 A1 May 3, 2018

(30) Foreign Application Priority Data

Oct. 31, 2016 (DE) .................. 10 2016 120 738

(51) Int. Cl.
*F02D 9/04* (2006.01)
*F02D 9/10* (2006.01)
(Continued)

(52) U.S. Cl.
CPC .............. *F02D 9/04* (2013.01); *F01N 1/18* (2013.01); *F01N 13/08* (2013.01); *F02D 9/10* (2013.01);
(Continued)

(58) Field of Classification Search
CPC ........ F01N 1/18; F01N 13/08; F01N 2240/36; F02D 9/04; F02D 9/10; F02D 9/1035;
(Continued)

(56) References Cited

U.S. PATENT DOCUMENTS 4,585,023 A * 4/1986 Almada ............... B08B 9/00
134/166 C
5,165,450 A * 11/1992 Marrelli ............... F16K 11/052
137/118.01
(Continued)

FOREIGN PATENT DOCUMENTS

| DE | 196 15 438 A1 | 1/1997 |
| DE | 10 2014 112398 A1 | 3/2016 |
| EP | 0 424 197 A1 | 4/1991 |

OTHER PUBLICATIONS

Machine Translation EP 04 424 197 Done Feb. 21, 2019 (Year: 1991).*

*Primary Examiner* — Patrick D Maines
*Assistant Examiner* — Dapinder Singh
(74) *Attorney, Agent, or Firm* — McGlew and Tuttle, P.C.

(57) ABSTRACT

An exhaust gas flap, especially for the exhaust gas stream of an internal combustion engine, includes a flap tube (22) and a flap diaphragm (24) carried in an interior of the flap tube on a pivot shaft (16) rotatable about a pivot axis. A flap wing (28, 30) is mounted on the pivot shaft (16) and a wing stop (32, 34) is associated with the flap wing (28, 30) on an inner circumferential area of the flap tube. The flap wing (28, 30) has a mounting area (56, 58) with uncurved mounting surfaces (60, 64). Opposing mounting surfaces (62, 66) or/and a mounting recess (52, 54) at the pivot shaft (16) provide an opposing mounting area that at least partially receives the flap wing mounting area (56, 58) of the flap wing (28, 30), the opposing mounting area being provided on the outer circumferential area of the pivot shaft (16).

15 Claims, 3 Drawing Sheets

(51) Int. Cl.
*F01N 1/18* (2006.01)
*F01N 13/08* (2010.01)
*F16K 1/22* (2006.01)
*F16K 1/226* (2006.01)
*F02M 26/70* (2016.01)

(52) U.S. Cl.
CPC ......... *F02D 9/1035* (2013.01); *F02D 9/1065* (2013.01); *F02M 26/70* (2016.02); *F16K 1/22* (2013.01); *F16K 1/2263* (2013.01); *F01N 2240/36* (2013.01)

(58) Field of Classification Search
CPC ......... F02D 9/1065; F02M 26/70; F16K 1/22; F16K 1/2263
USPC .......................................................... 60/324
See application file for complete search history.

(56) References Cited

U.S. PATENT DOCUMENTS

| | | | | |
|---|---|---|---|---|
| 5,899,805 A * | 5/1999 | Dowd | ................... | B64D 13/00 |
| | | | | 137/875 |
| 5,908,047 A * | 6/1999 | Nakamura | .............. | F01N 3/027 |
| | | | | 137/625.44 |
| 6,182,699 B1 * | 2/2001 | Hawkes | ................ | F16K 11/052 |
| | | | | 137/861 |
| 6,955,188 B2 * | 10/2005 | Heckt | .................... | F01N 3/031 |
| | | | | 137/87.01 |
| 9,752,687 B2 | 9/2017 | Bareis et al. | | |
| 2013/0299728 A1 | 11/2013 | Yokoyama et al. | | |

* cited by examiner

- Prior Art -

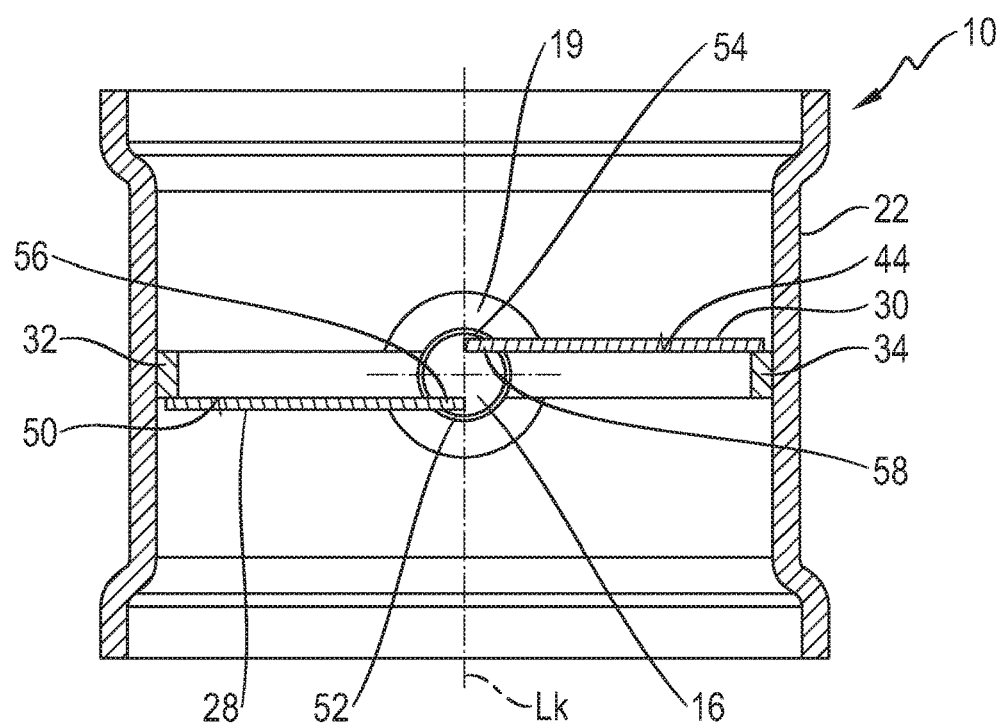

EXHAUST GAS FLAP

CROSS REFERENCE TO RELATED APPLICATIONS

This application claims the benefit of priority under 35 U.S.C. § 119 of German Application 10 2016 120 738.1, filed Oct. 31, 2016, the entire contents of which are incorporated herein by reference.

FIELD OF THE INVENTION

The present invention pertains to an exhaust gas flap, especially for the exhaust gas stream of an internal combustion engine, comprising a flap tube, a flap diaphragm, which is carried in the interior of the flap tube on a pivot shaft rotatable about a pivot axis, with at least one flap wing mounted on the pivot shaft, as well as with a wing stop in association with at least one flap wing on an inner circumferential area of the flap tube.

BACKGROUND OF THE INVENTION

An exhaust gas flap, which is disclosed in the subsequently published German Patent Application DE 10 2016 111 681 and can be used, for example, in an exhaust system of an internal combustion engine, is generally designated by 10 in FIG. 1. A flap drive 12, which operates, for example, by means of an electric motor, is associated with the exhaust gas flap 10. A drive shaft 14 of the flap drive 12 is coupled with a pivot shaft 16 of the exhaust gas flap 10 for joint rotation. The pivot shaft 16 is carried in its two end areas 18, 20 pivotably about a pivot axis A at a flap tube 22 via a bearing, not shown, in bearing bushes 19, 21.

A flap diaphragm, generally designated by 24, is carried on the pivot shaft 16 in the interior of the flap tube 22, which is configured with an essentially circular cross section and a correspondingly circular inner contour in this exemplary embodiment. The flap diaphragm 24 comprises two flap wings 28, 30 mounted with a corresponding mounting area on the pivot shaft 16 by welding. The mounting areas of the flap wings 28, 30, of which the mounting area 26 of the flap wing 30 can be seen in FIG. 1, have a tubular, curved configuration and enclose the pivot shaft 16, which is configured with a circular outer circumferential contour, in a partial area of its outer circumference.

A wing stop 32, 34, which has a ring-segment-like configuration, is provided at the flap tube 22 in association with each of the two flap wings 28, 30. The two wing stops 32, 34 are connected in substance on the inner circumference 36 of the flap tube 22. As illustrated in FIG. 1, for example, on the basis of the wing stop 34, this wing stop 34 extends without interruption along the inner circumference 36 of the flap tube 22 starting from a first circumferential end area 38 lying near the first axial end area 18 of the pivot shaft 16 to a second circumferential end area 40 lying near the second axial end area 20 of the pivot shaft 16. The wing stop 34 provides a stop surface 44 for the flap wing 30 on an end face 42 oriented in the direction of a flap tube longitudinal axis.

In order to avoid a mutual interference of the mounting areas of the flap wings 28, 30 with the wing stops 32, 34 reaching up to the pivot shaft 16 when the flap diaphragm 24 rotates about the pivot axis A, recesses, into which the circumferential end areas 38, 40 of the wing stops 32, 34 can enter when the flap diaphragm 24 is rotated, are provided in the axial end areas of the mounting areas in relation to the pivot axis A. The recesses 46, 48 provided in the mounting area 26 of the flap wing 30 can be seen in FIG. 1.

SUMMARY OF THE INVENTION

An object of the present invention is to provide an exhaust gas flap, especially for the exhaust gas stream of an internal combustion engine, which has a structurally simple configuration and does not permit essentially any leak flows when the flap diaphragm is positioned in a closed position.

According to the present invention, this object is accomplished by an exhaust gas flap, especially for the exhaust gas stream of an internal combustion engine, comprising a flap tube, a flap diaphragm, which is carried in the interior of the flap tube on a pivot shaft rotatable about a pivot axis, with at least one flap wing mounted on the pivot shaft, as well as a wing stop in association with at least one, preferably with each flap wing on an inner circumferential area of the flap tube.

In this connection, provisions are further made for at least one, preferably each flap wing to have a mounting area with an essentially uncurved mounting surface, and an essentially uncurved opposite mounting surface, which is located opposite the mounting surface, to be provided at the pivot shaft in association with this flap wing, or/and for a mounting recess providing an opposite mounting area and at least partially receiving a mounting area of this flap wing to be provided on the outer circumferential area of the pivot shaft in association with at least one, preferably with each flap wing.

Due to the configuration according to the present invention of the flap diaphragm, especially of the pivot shaft and of one or more flap wings to be connected with the pivot shaft, it becomes possible to provide with a simple structural configuration an essentially complete closure of the flow path even in the adjoining area of a respective wing stop at the pivot shaft when the flap diaphragm is in the closed position in order to thus essentially prevent leak flows. Further, the exhaust gas flap having this configuration is provided with very good acoustic tightness.

In order to be able to provide an essentially symmetrical configuration in relation to the pivot axis of the pivot shaft, provisions may be made according to the present invention for two flap wings to be mounted on the pivot shaft, and for a mounting recess to be provided in association with each flap wing, wherein the mounting recesses associated with the two flap wings are preferably configured as essentially having radial or axial symmetry in relation to the pivot axis.

A symmetrical configuration of the flap diaphragm of an exhaust gas flap configured according to the present invention is further supported when two flap wings are mounted on the pivot shaft and an opposite mounting surface is provided in association with each flap wing. In this connection, the opposite mounting surfaces associated with the two flap wings are arranged essentially parallel to one another.

A reliable closure against the passing through of exhaust gas in the area of the contact interaction of a flap wing with the wing stop associated with same can be achieved, for example, in association with at least one, preferably with each flap wing, by the wing stop associated with this flap wing having a stop surface essentially oriented in the direction of a flap tube longitudinal axis, and by the flap wing being in contact with the stop surface of the wing stop and the opposite mounting surface located opposite the mounting surface of this flap wing being set back in relation to the stop surface in the direction of the flap tube longitudinal axis or/and being arranged essentially parallel to the stop surface when the flap diaphragm is positioned in a closed position.

In this embodiment as well, a symmetrical configuration of the flap diaphragm and thus a similar interaction of each flap wing with the associated wing stop can be supported, in association with each flap wing, by the wing stop associated with this flap wing having a stop surface essentially oriented in the direction of a flap tube longitudinal axis, and by a distance of the opposite mounting surfaces associated with the two flap wings to one another being smaller than a distance of the stop surfaces associated with the two flap wings to one another in the direction of the flap tube longitudinal axis.

In this exhaust gas flap according to the present invention, the mounting recess, preferably each mounting recess, provided in association with at least one flap wing, may provide the opposite mounting surface located opposite the mounting surface of this flap wing.

Provisions may further be made for at least one mounting recess to be provided only in the length area of the pivot shaft extending in the interior of the flap tube. In the length areas passing through the flap tube in each of the openings provided in the area for this purpose, such recesses are then not provided, which especially also ensures an improved bearing interaction of the pivot shaft with bearings pivoting this pivot shaft.

In order to be able to guarantee a defined positioning for this flap wing during the assembly of the flap diaphragm, i.e., when a respective flap wing is mounted on the pivot shaft, it is proposed that in association with at least one, preferably with each flap wing, a mounting stop predetermining a positioning of this flap wing in relation to the pivot shaft be provided on the pivot shaft essentially at right angles to the pivot axis.

This can be achieved, for example, in case of a structurally simple configuration, by the mounting recess associated with this flap wing providing a mounting stop surface, which is preferably essentially at right angles to the opposite mounting surface provided by this mounting recess.

An interaction of a respective flap wing with a wing stop essentially preventing the passing through of exhaust gas in the closed position of the flap diaphragm can be achieved by the pivot shaft being carried rotatably about the pivot axis in its two axial end areas at the flap tube, and by a stop surface of at least one, preferably of each wing stop extending in the circumferential direction from a first circumferential end area positioned in the area of a first axial end area of the pivot shaft without interruption to a second circumferential end area of the wing stop positioned in the area of a second axial end area of the pivot shaft.

In order to be able to bring the flap diaphragm in the flap tube into various operating positions, it is provided that the pivot shaft be coupled in one of its two axial end areas with a flap drive driving the pivot shaft for the rotation about the pivot axis.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a longitudinal sectional view showing a flap diaphragm configured according to the present invention;

FIG. 3 is a detail cross-sectional view of a pivot shaft of the exhaust gas flap and of the components interacting with the pivot shaft of the exhaust gas flap according to the present invention;

DESCRIPTION OF THE PREFERRED EMBODIMENTS

Figure 1:
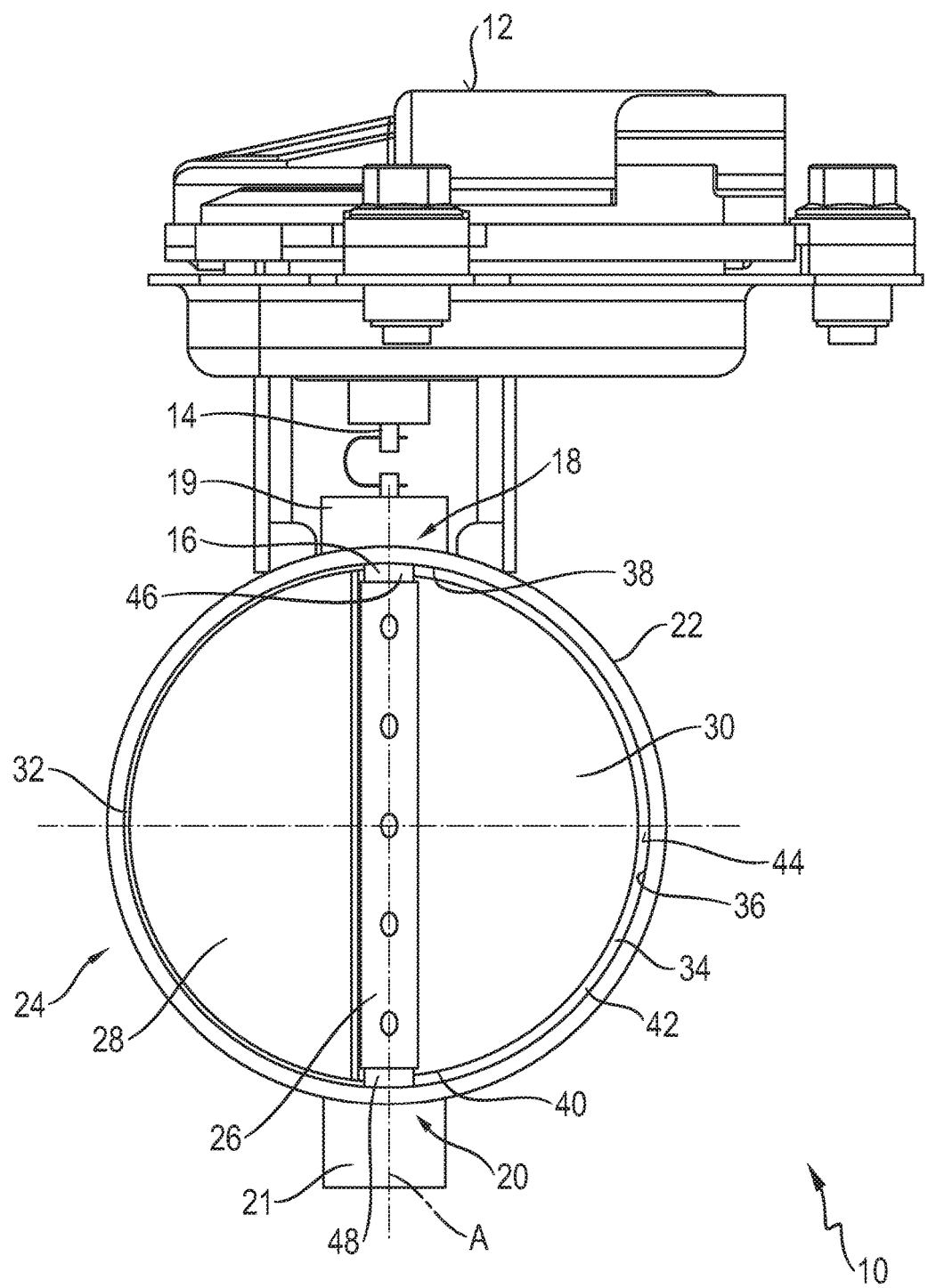
FIG. 1 is a side and partially sectional view showing an exhaust gas flap with associated flap drive known from the state of the art.

The configuration according to the present invention of an exhaust gas flap according to the present invention is described in detail below. The basic configuration of this exhaust gas flap and also the interaction of the flap diaphragm of same with the flap drive and with the wing stops correspond in many areas to the configuration described above with reference to FIG. 1. Hence, reference is made in this respect to the above explanations regarding FIG. 1, which, in respect to these general aspects, also shows a configuration, in which the configuration aspects according to the present invention described in detail below can be achieved.

FIG. 2 shows in longitudinal section the flap tube 22 of the exhaust gas flap 10 according to the present invention. This flap tube 22 has an essentially cylindrical configuration, for example, with a circular contour, especially in that area, in which the pivot shaft 16 is carried on the flap tube 22.

The flap diaphragm 24 has two flap wings 28, 30, which may be configured essentially identical to one another and can interact in a similar manner with the wing stops 32, 34 associated with these flap wings 28, 30.

In their entirety, the two wing stops 32, 34 may provide a ring-like structure. The wing stop 32 associated with the flap wing 28 provides a stop surface, which is oriented downwards in the view of FIG. 2 and thus essentially in the direction of the flap tube longitudinal axis LK, while the wing stop 34 associated with the flap wing 30 provides a stop surface 44, which is oriented upwards in the view of FIG. 2 and thus likewise in the direction of the flap tube longitudinal axis LK and which was already mentioned in reference to FIG. 1. Each of these stop surfaces 50, 44, which preferably have an essentially flat configuration, extends in a semicircular manner between the two axial end areas, 18, 20 of the pivot shaft 16, so that an only minimal gap-like intermediate space is formed between each of the stop surfaces 50, 44 and the pivot shaft 16.

The pivot shaft 16, which is configured, for example, with a circular outer circumferential contour, has a mounting recess 52, 54 each at positions diametrically opposed to one another in relation to the pivot axis A. These mounting recesses 52, 54 are dimensioned in the direction of the pivot axis A such that they extend only in the length area of the pivot shaft 16 extending in the interior of the flap tube 22. The pivot shaft is preferably configured with an essentially circular circumferential contour over the entire circumference in length areas passing through openings in the flap tube 22 and mounted, for example, within the bearing bushes 19, 21.

The flap wing 28 is positioned with a mounting area 56 meshing with the mounting recess 52. The flap wing 30 is positioned with a mounting area 58 meshing with the mounting recess 54. In this connection, it should be mentioned with reference to FIG. 3 that this represents a positioning of the two flap wings 28, 30 and also of the pivot shaft 16, which places the flap diaphragm 24 in a closed position. In this position, the two flap wings 28, 30 are in contact with the associated wing stops 32, 34 and the stop surfaces 50, 44.

An essentially flat, i.e., uncurved mounting surface 60, which is located opposite an opposite mounting surface 62 provided by the mounting recess 52, is provided in the mounting area 56 of the flap wing 28. In a corresponding manner, a mounting surface 64, which is located opposite an opposite mounting surface 66 of the mounting recess 54, is provided in the mounting area 58 of the flap wing 30. Each of the mounting recesses 52, 54 further provides a mounting stop surface 68 and 70, respectively, with which a respective mounting area 56 or 58 is in contact in a direction essentially at right angles to the pivot axis A in order to thus predetermine a defined positioning of the flap wings 28, 30 in relation to the pivot shaft 16 especially during the assembly of the flap diaphragm 24.

It is seen in FIG. 3 that the distance D measured in the direction of the flap tube longitudinal axis LK of the stop surfaces 50, 44 associated with the two flap wings 28, 30 is greater than the distance D of the opposite mounting surfaces 62, 66, which are essentially parallel to one another. This leads to a gap-like intermediate space being present between a respective mounting area 56, 58 and the opposite mounting surface 62, 66 located opposite the mounting surface 60, 64 of a respective mounting area 56, 58 when the flap wings 28, 30 are in contact with the stop surfaces 50, 44 and when the pivot shaft 16 is positioned such that the mounting areas 56, 58 of the flap wings 28, 30 are flush in contact with the mounting stop surfaces 68, 70 and in this case the opposite mounting surfaces 62, 66, which are oriented essentially at right angles to the mounting stop surfaces 68, 70, are essentially parallel to the stop surfaces 50, 44.

During the assembly of the exhaust gas flap, after the pivot shaft 16 has first been mounted in the bearing bushes 19, 21 rotatably on the flap tube 22 without the flap wings 28, 30 mounted thereon, the pivot shaft 16 can be positioned such that the mounting recesses 52, 54, which are preferably configured with radial or axial symmetry in relation to the pivot axis A, are positioned such that the opposite mounting surfaces 62, 66 provided by these mounting recesses 52, 54 are oriented essentially parallel to the stop surfaces 50, 44 of the wing stops 32, 34, which have also been mounted on the flap tube 22 beforehand. Subsequently, the flap wings 28, 30 are mounted by being positioned in contact with the respectively associated wing stops 32, 34 and the stop surfaces 50, 44 of same and also with the mounting stop surfaces 68, 70. This process can be carried out at the same time for both flap wings 28. However, one of the two flap wings 28, 30 may, in principle, also first be connected to the pivot shaft 16, followed by the other flap wing.

Figure 4:
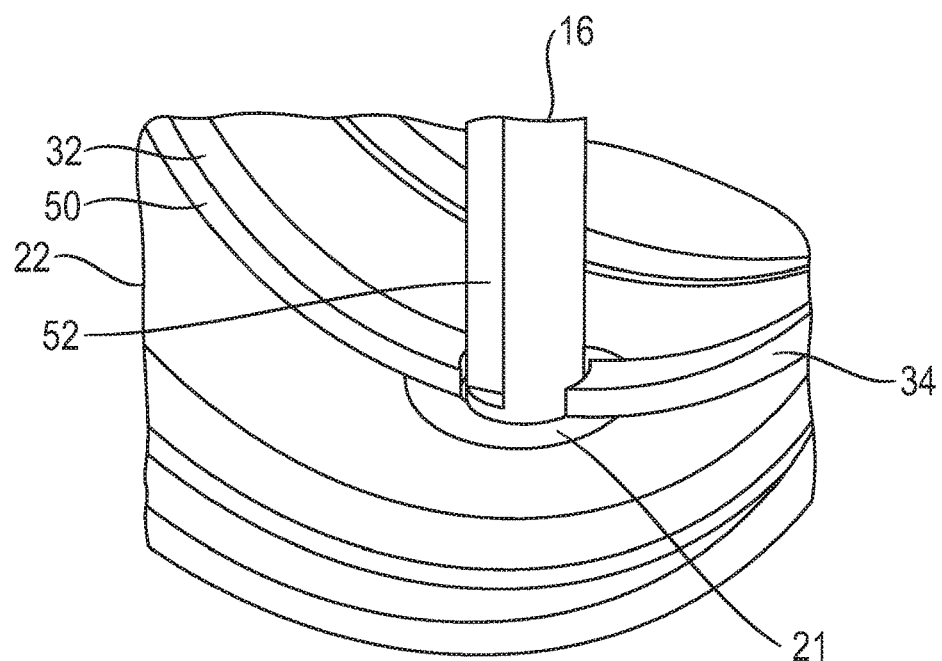
FIG. 4 is a perspective detail view corresponding to FIG. 3 without flap wings mounted on the pivot shaft.
Figure 5:
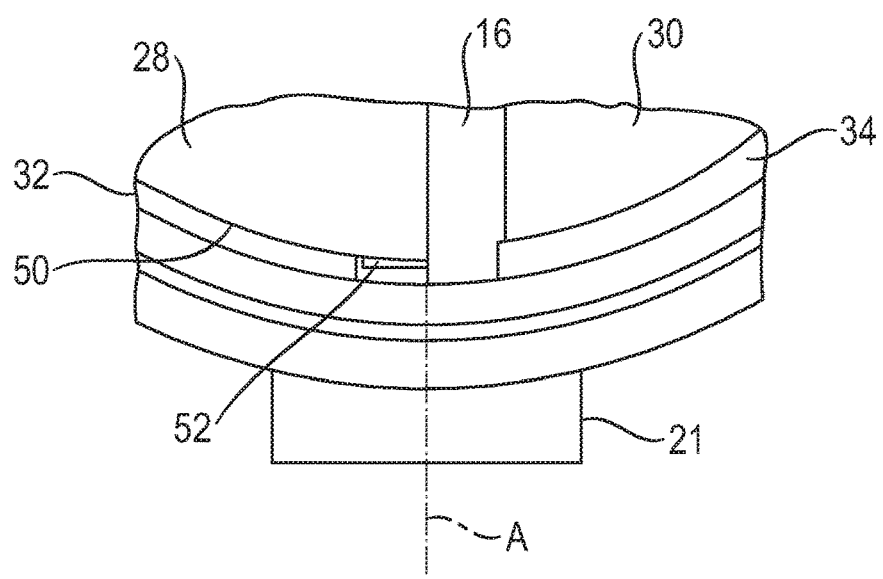
FIG. 5 is a detail view corresponding to FIG. 3, viewed in the direction of a flap tube longitudinal axis.

After, for example, one of the two flap wings 28, 30 has been arranged in the position described above, the pivot shaft 16 can, if necessary, still be rotated slightly by acting, for example, on the axial end area 18 of the pivot shaft 16, in order to bring it into the position provided for permanent connection to this flap wing, as it is shown, for example, in FIGS. 3-5, provided that this position of the pivot shaft 16 has not yet been exactly reached beforehand. Subsequently, the flap wing, for example, the flap wing 28, can then be connected to the pivot shaft 16 by welding. To this end, a fillet weld 72 can be produced between the mounting stop surface 68 and the adjoining mounting area 56 of the flap wing 28, for example, by means of laser welding. In a corresponding manner, a fillet weld 74 can be produced between the flap wing 30 and the mounting stop surface 70. Welds, for example, also fillet welds, may also be formed in those areas, in which the mounting surfaces 60, 64 are located opposite the opposite mounting surfaces 62, 66 adjoining the outer circumferential area of the pivot shaft 16, after rotation of the pivot shaft 16 connected to the flap wings 28, 30 from the closed position of the flap diaphragm 24 shown in FIG. 2 and in FIG. 3, in order to support the stable connection of the flap wings 28, 30 to the pivot shaft 16 in this manner. Especially these fillet welds are to be produced such that a mutual interference with the circumferential end areas of the wing stops 32, 34, which have reached very close up to the pivot shaft 16, is avoided.

Since, in case of the above-described configuration, the flap wings 28, 30 are positioned with their mounting areas 56, 58 meshing with the mounting recesses 52, 54 and thus an enclosing of the pivot shaft 16 at its outer circumferential area by the flap wings 28, 30, as is the case in the configuration known from the above-described state of the art, is avoided, the problem that a mutual interference of the mounting areas 56, 58 with the wing stops 32, 34 having reached close to the pivot shaft 16 occurs does not exist during the rotation of the flap diaphragm 24 from the closed position shown in FIGS. 2 and 3 into an open position rotated by about 90° in relation to this closed position, at which the two flap wings 28, 30 extend essentially in the direction of the flap tube longitudinal axis LK. For this, each of the mounting recesses 52, 54 is preferably dimensioned such that it extends in the circumferential direction over no more than ¼ of the outer circumference of the pivot shaft 16.

Therefore, in the adjoining area of the flap wings 28, 30 and of the mounting areas 56, 58 of same at the axial end areas 18, 20 of the pivot shaft 16, the flap wings 28, 30 may extend up to the mounting stop surfaces 68, 70 as well, so that the formation of gap-like intermediate spaces, through which exhaust gas could pass through even in the closed position of the flap diaphragm 24, at the axial end areas 18, 20 of the pivot shaft 16 is essentially avoided. Thus, the acoustic tightness of the exhaust gas flap 10 is also supported. The flap wings 28, 30 can thus interact with the stop surfaces 50, 44 of the wing stops 32, 34 essentially over their entire outer circumferential area for closing the flap tube 22. This also contributes to the pivot shaft 16 and the opposite mounting surfaces 62, 64 provided on it being dimensioned and positioned in relation to one another such that it is guaranteed during the assembly and after the assembly that the flap wings 28, 30 are in full contact with the wing stops 32, 34 associated with each of them, even though, however, the configuration of the flap diaphragm 24, which is especially advantageous for the functionality of the exhaust gas flap 10 and is essentially symmetrical in relation to the pivot axis A, can be achieved. Due to the specific provision of the gap-like intermediate spaces between the mounting surfaces 60, 64 and the opposite mounting surfaces 62, 66, which are each located opposite one another, it is also ensured, taking into consideration the manufacturing tolerances that are unavoidable in the configuration of such systems, that this contact between the flap wings 28, 30 and the associated stop surfaces 50, 44 in the closed position of the flap diaphragm 24 can be reached in a reliable manner.

While specific embodiments of the invention have been shown and described in detail to illustrate the application of the principles of the invention, it will be understood that the invention may be embodied otherwise without departing from such principles.

What is claimed is:

1. An exhaust gas flap, for an exhaust gas stream of an internal combustion engine, the exhaust gas flap comprising:
a flap tube;
a pivot shaft rotatable about a pivot axis;
a flap diaphragm comprising at least one flap wing mounted on the pivot shaft;
a wing stop associated with the at least one flap wing on an inner circumferential area of the flap tube, wherein:
the at least one flap wing has a mounting area having an essentially uncurved wing mounting surface; and
the pivot shaft, in association with the at least one flap wing, has an opposite mounting area with an essentially uncurved opposite mounting surface, the uncurved opposite mounting surface being located opposite the essentially uncurved wing mounting surface;
the wing stop associated with the at least one flap wing has a stop surface oriented essentially in the direction of a flap tube longitudinal axis, and when the flap diaphragm is positioned in a closed position, the at least one flap wing is in contact with the stop surface of the wing stop and the opposite mounting surface located opposite the mounting surface of the at least one flap wing is set back in the direction of the flap tube longitudinal axis in relation to the stop surface.

2. An exhaust gas flap in accordance with claim 1, further comprising another flap wing, wherein the flap wings are mounted on the pivot shaft and the pivot shaft includes another mounting recess, whereby one of the mounting recesses is provided in association with each flap wing.

3. An exhaust gas flap in accordance with claim 2, wherein the mounting recesses associated with the two flap wings are configured as essentially having radial symmetry in relation to a pivot axis of the pivot shaft.

4. An exhaust gas flap in accordance with claim 2, wherein the flap wings are mounted on the pivot shaft, and an opposite mounting surface of the pivot shaft is provided in association with each flap wing.

5. An exhaust gas flap in accordance with claim 4, wherein the opposite mounting surfaces associated with the two flap wings are arranged essentially parallel to one another.

6. An exhaust gas flap in accordance with claim 2, wherein a distance of the opposite mounting surfaces associated with the two flap wings to one another is smaller than a distance of the stop surfaces associated with the two flap wings to one another in the direction of the flap tube longitudinal axis.

7. An exhaust gas flap in accordance with claim 1, wherein when the flap diaphragm is positioned in the closed position, the opposite mounting surface located opposite the mounting surface of the at least one flap wing is arranged essentially parallel to the stop surface.

8. An exhaust gas flap in accordance with claim 1, wherein the mounting recess provided in association with the at least one flap wing provides the opposite mounting surface located opposite the wing mounting surface, or/and that at least one mounting recess is provided only in a length area of the pivot shaft extending in the interior of the flap tube.

9. An exhaust gas flap in accordance with claim 8, wherein the mounting recess associated with the at least one flap wing provides a mounting stop surface, which mounting stop surface is essentially at right angles to the opposite mounting surface provided by the mounting recess.

10. An exhaust gas flap in accordance with claim 1, wherein in association with at least one flap wing, a mounting stop, predetermining a positioning of the at least one flap wing in relation to the pivot shaft, is provided on the pivot shaft essentially at right angles to the pivot axis.

11. An exhaust gas flap in accordance with claim 10, wherein the mounting recess associated with the at least one flap wing provides a mounting stop surface, which mounting stop surface is essentially at right angles to the opposite mounting surface provided by the mounting recess.

12. An exhaust gas flap in accordance with claim 1, wherein the pivot shaft is carried rotatably about the pivot axis in two pivot shaft axial end areas at the flap tube, and a stop surface of the at least one wing stop extends in the circumferential direction from a first circumferential end area, positioned in the area of a first pivot shaft axial end area without interruption, to a second circumferential end area, positioned in the area of a second axial end area of the pivot shaft.

13. An exhaust gas flap in accordance with claim 1, wherein the pivot shaft has two pivot shaft axial end areas and one of the two pivot shaft axial end areas is coupled with a flap drive driving the pivot shaft for the rotation about the pivot axis.

14. An exhaust gas flap in accordance with claim 1, wherein the pivot shaft, in association with the at least one flap wing, has a mounting recess provided on an outer circumferential area of the pivot shaft and providing an opposite mounting area and at least partially receiving the wing mounting area.

15. An exhaust gas flap comprising:
a flap tube with an inner circumferential area and a flap tube longitudinal axis;
a flap diaphragm comprising a flap wing movably mounted in said flap tube, said flap wing having a wing mounting area with a flat wing mounting surface;
a pivot shaft rotatably mounted in said flap tube about a pivot axis, said pivot shaft having a mounting recess on an outer circumferential area of said pivot shaft, said mounting recess providing an opposite mounting area and at least partially receiving said wing mounting area, said opposite mounting area having a flat opposite mounting surface, said flap wing mounting surface being mounted on said opposite mounting surface of said pivot shaft, said pivot shaft with said flap diaphragm being movably mounted in said flap tube between an open position and a closed position;
a wing stop mounted on said inner circumferential area of said flap tube, said wing stop having a stop surface oriented in a direction of said flap tube longitudinal axis, said wing stop and said flap wing being configured in said closed position with said flap wing in contact with said stop surface of said wing stop, said opposite mounting surface being spaced from said stop surface in said direction of the flap tube longitudinal axis.

* * * * *